(12) United States Patent
Naiki et al.

(10) Patent No.: US 8,955,831 B2
(45) Date of Patent: Feb. 17, 2015

(54) FLUID-FILLED VIBRATION DAMPING RUBBER DEVICE

(71) Applicant: Tokai Rubber Industries, Ltd., Komaki-shi, Aichi-ken (JP)

(72) Inventors: Hiroaki Naiki, Komaki (JP); Norihito Kimura, Komaki (JP)

(73) Assignee: Sumitomo Riko Company Limited, Komaki (JP)

( * ) Notice: Subject to any disclaimer, the term of this patent is extended or adjusted under 35 U.S.C. 154(b) by 193 days.

(21) Appl. No.: 13/796,246

(22) Filed: Mar. 12, 2013

(65) Prior Publication Data

US 2013/0187317 A1    Jul. 25, 2013

Related U.S. Application Data

(63) Continuation of application No. PCT/JP2012/057807, filed on Mar. 26, 2012.

(30) Foreign Application Priority Data

Mar. 30, 2011   (JP) .................. 2011-074929

(51) Int. Cl.
*F16F 15/023*   (2006.01)
*F16F 13/08*   (2006.01)
*F16F 13/10*   (2006.01)

(52) U.S. Cl.
CPC .............. *F16F 13/08* (2013.01); *F16F 13/10* (2013.01); *F16F 2224/025* (2013.01); *F16F 2224/04* (2013.01)
USPC .................. 267/140.13; 267/140.11

(58) Field of Classification Search
CPC .. F16F 13/10; F16F 2224/04; F16F 2224/025
See application file for complete search history.

(56) References Cited

U.S. PATENT DOCUMENTS 5,059,339 A    10/1991   Suzuki et al.
6,250,615 B1 *  6/2001   Leibach ................. 267/140.13
(Continued)

FOREIGN PATENT DOCUMENTS

JP    63-083426 A    4/1988
JP    64-051488 A    2/1989
(Continued)

OTHER PUBLICATIONS

Notification of Transmittal of Translation of the International Preliminary Report on Patentability (Form PCT/IB/338) of International Application No. PCT/JP2012/057807 mailed on Oct. 10, 2013 with Forms PCT/IB/373 and PCT/ISA/237 (5 pages).

(Continued)

*Primary Examiner* — Thomas Irvin
(74) *Attorney, Agent, or Firm* — Westerman, Hattori, Daniels & Adrian, LLP

(57) ABSTRACT

Provided is a fluid-filled vibration damping rubber device, including enclosed spaces (primary fluid chamber and auxiliary fluid chamber) formed by chamber walls (vibration damping rubber body and rubber membrane) which deform in accordance with vibration input, the enclosed spaces being filled with a fluid, in which: the chamber walls each include a diene-based rubber; and the fluid includes a glycol-based solution containing a benzotriazole-based compound having an amine group. The fluid-filled vibration damping rubber device is capable of eliminating the degradation of the chamber walls (rubber bodies) and the deterioration of its durability due to the dissolution of components in the rubber bodies into the filling fluid.

20 Claims, 2 Drawing Sheets

(56) References Cited

U.S. PATENT DOCUMENTS

| | | |
|---|---|---|
| 7,759,293 B2* | 7/2010 | Shirahama et al. ............ 508/208 |
| 2009/0005274 A1* | 1/2009 | Swartele et al. .............. 508/110 |
| 2010/0130394 A1* | 5/2010 | Tsubouchi .................... 508/478 |
| 2010/0270716 A1 | 10/2010 | Ueki et al. |
| 2011/0237477 A1* | 9/2011 | Tagawa et al. ................ 508/469 |
| 2013/0102506 A1* | 4/2013 | Yoshida et al. ............... 508/249 |
| 2013/0270049 A1* | 10/2013 | Sherman et al. .............. 188/266 |
| 2014/0191453 A1* | 7/2014 | Naiki et al. .............. 267/140.13 |
| 2014/0230695 A1* | 8/2014 | Park et al. ................ 106/287.21 |

FOREIGN PATENT DOCUMENTS

| | | |
|---|---|---|
| JP | 2-085540 A | 3/1990 |
| JP | 05-140579 A | 6/1993 |
| JP | 2007-205550 A | 8/2007 |
| JP | 2008-255247 A | 10/2008 |
| JP | 2011-027770 A | 2/2011 |

OTHER PUBLICATIONS

International Search Report dated Jun. 5, 2012, issued in corresponding application No. PCT/JP2012/057807.

* cited by examiner

FLUID-FILLED VIBRATION DAMPING RUBBER DEVICE

RELATED APPLICATION

This application is a continuation of International Application No. PCT/JP2012/057807, filed on Mar. 26, 2012, which claims priority to Japanese Patent Application No. 2011-074929, filed on Mar. 30, 2011, the entire contents of each of which are hereby incorporated by reference.

BACKGROUND OF THE INVENTION

1. Field of the Invention

The present invention relates to a fluid-filled type vibration damping rubber device which may be widely used, such as in an engine mount and a suspension bushing for an automobile, a vibration damping member for an industrial machine, and the like.

2. Description of the Related Art

Vibration damping rubber members, such as an engine mount and a suspension bushing, which are used as connecting members between various components of an automobile, such as an engine and a frame, express vibration damping performance by virtue of, for example, a spring characteristic and a vibration attenuation characteristic exerted by a rubber body (vulcanized rubber molded body). In recent years, various fluid-filled type vibration damping rubber devices have been proposed, which have further improved the vibration damping performance by filling the vibration damping rubber member with a fluid (see, for example, JP-A-SHO-63-83426, JP-A-SHO-64-51488, and JP-A-HEI-5-140579).

The fluid-filled type vibration damping rubber device includes chamber walls, which deform in accordance with vibration and are each made of a rubber body, and an enclosed space formed by the chamber walls is filled with a filling fluid such as ethylene glycol. In addition, the rubber body generally contains an antioxidant, a vulcanization accelerator, and the like in order to improve rubber characteristics (in particular, heat resistance and permanent set resistance).

However, in the fluid-filled type vibration damping rubber device as described above, components, such as the antioxidant, in the rubber body constituting each of the chamber walls for fluid filling dissolve into the filling fluid in some cases owing to ambient temperature, the passing of time, endurance use, or the like. In addition, when such dissolution of the antioxidant or the like occurs, there is a risk that the rubber body could become degraded and its durability could deteriorate.

SUMMARY OF THE INVENTION

A fluid-filled vibration damping rubber device is provided, which is capable of eliminating the degradation of a rubber body and the deterioration of its durability due to the dissolution of components in the rubber body into the filling fluid.

A fluid-filled vibration damping rubber device of the present invention includes an enclosed space formed by chamber walls which deform in accordance with vibration input, the enclosed space being filled with a fluid, in which: the chamber walls each include a diene-based rubber; and the fluid includes a glycol-based solution containing a benzotriazole-based compound having an amine group.

That is, the inventors of the present invention have made extensive studies to solve the problems. In the course of the studies, the inventors of the present invention have conceived an idea of forming a protective membrane at an interface between a rubber body and a filling fluid so that, in a fluid-filled type vibration damping rubber device, components in the rubber body such as an antioxidant may not dissolve into the filling fluid. However, an operation of forming the protective membrane on the surface of the rubber body (inner peripheral surface of a rubber chamber wall forming an enclosed space to be filled with the filling fluid) increases production cost. Hence, the inventors of the present invention have examined whether or not the protective membrane can be formed through an interaction between the surface of the rubber body and some special additive added in the filling fluid without performing a working process, and have conducted further studies. As a result, the inventors have discovered the following fact. When a benzotriazole-based compound having an amine group is used as the special additive and blended into a glycol-based solvent to provide a filling fluid, and a diene-based rubber is used as a polymer for the rubber body, a membranous substance is formed on the surface of the rubber body with the passing of time through the interaction between a component in the filling fluid and a component of the diene-based rubber. Thus, the degradation of the rubber body and the deterioration of its durability can be eliminated.

More specifically, the membranous substance is made of the benzotriazole-based compound. That is, the following mechanism is conceivable. Molecules of the benzotriazole-based compound dissolved in the filling fluid assemble on the surface of the rubber body made of the diene-based rubber to allow the amine group of the benzotriazole-based compound and the double bond of the diene in the diene-based rubber to react with each other. Accordingly, the membrane made of the benzotriazole-based compound is formed so as to closely adhere to the surface of the rubber body. In addition, owing to the molecular structure of the benzotriazole-based compound or the like, the membrane formed on the surface of the rubber body is dense, and hence the membrane functions as a protective membrane, thereby providing an action and effect of suppressing the dissolution of components in the rubber body, such as an antioxidant, into the filling fluid.

The fluid-filled vibration damping rubber device includes an enclosed space formed by chamber walls each made of a rubber body, the enclosed space being filled with a fluid (filling fluid), in which the chamber walls are each made of a diene-based rubber, and the fluid is made of a glycol-based solution containing a benzotriazole-based compound having an amine group. Thus, the degradation of the rubber body and the reduction of vibration damping performance due to the dissolution of components in the rubber body into the filling fluid as observed in a conventional fluid-filled type vibration damping rubber device can be eliminated. In addition, the fluid-filled vibration damping rubber device is also excellent in terms of production cost because a membrane made of the benzotriazole-based compound and a component of the diene-based rubber is naturally formed at an interface between the rubber body and the filling fluid through the passing of time without involving a step for a particular operation such as an operation of forming a protective membrane at the interface, and thus the problems can eliminated.

Particularly when the benzotriazole-based compound having an amine group has a weight-average molecular weight (Mw) of 300 or less, a denser membrane of the benzotriazole-based compound is formed. With this, the dissolution of components in the rubber body into the filling fluid can be further suppressed and the fluid-filled vibration damping rubber device can perform even better.

DETAILED DESCRIPTION OF THE INVENTION

Next, an embodiment is described.

As described previously, a fluid-filled vibration damping rubber device includes an enclosed space formed by chamber walls which deform in accordance with vibration input, the enclosed space being filled with a fluid (filling fluid), in which the chamber walls are each made of a diene-based rubber, and the fluid is made of a glycol-based solution containing a benzotriazole-based compound having an amine group.

Figure 1:
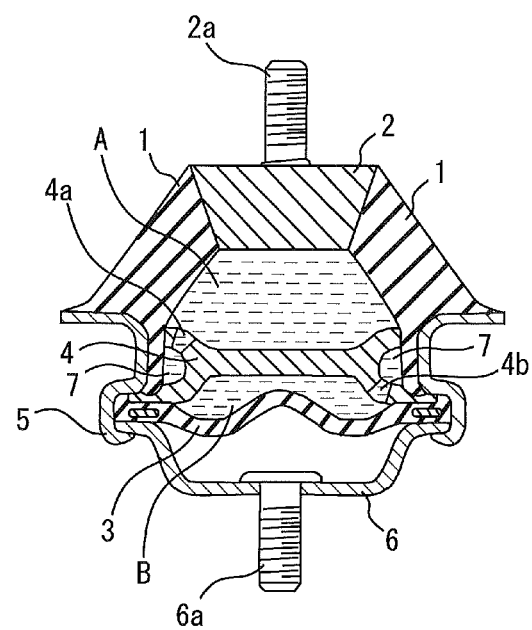
FIG. 1 is a cross-sectional view illustrating a fluid-filled vibration damping mount as a fluid-filled vibration damping rubber device according to an embodiment.

FIG. 1 illustrates a fluid-filled vibration damping rubber device according to an embodiment, and a fluid-filled vibration damping mount is illustrated in this embodiment. In the figure, reference numeral 1 represents a vibration damping rubber body of a thick frusto-conical shape which has a primary fluid chamber A formed inside. A thick connecting member 2 made of metal (metal piece) is inserted in an upper opening of the vibration damping rubber body 1 so as to close the opening, and an upper end portion of the vibration damping rubber body 1 and an outer peripheral surface of the connecting member 2 are joined to each other with an adhesive or the like. The connecting member 2 has a bolt 2a provided on an upper surface thereof in a protruding manner, and is connected to an engine as a vibrating body with the bolt. In addition, an outer periphery of the vibration damping rubber body 1 is joined to a metal side plate 5 having a cylindrical shape which forms a part of the connecting member made of metal also with an adhesive or the like. A thin rubber membrane 3 is provided below the vibration damping rubber body 1, and a portion above the rubber membrane serves as an auxiliary fluid chamber B. The auxiliary fluid chamber B and the primary fluid chamber A are separated from each other by a partition plate 4. An outer periphery of each of the partition plate 4, the rubber membrane 3, and a support plate 6 made of metal provided below the rubber membrane is held within a lower end portion of the side plate 5 bent in a U-shape, and is fixed by caulking it. The side plate 5 and the support plate 6 connected thereto constitute a connecting member made of metal which is connected to a vehicle body as a base body with a bolt 6a provided at a lower end of the support plate 6 in a protruding manner. The primary fluid chamber A and the auxiliary fluid chamber B are each filled with a filling fluid. Further, a fluid flow path 7 is formed in an outer peripheral portion of the partition plate 4, and the fluid flow path 7 is in communication with each of the primary fluid chamber A and the auxiliary fluid chamber B via communicating holes 4a, 4b, respectively, provided in the partition plate 4. In addition, when the vibration damping rubber body 1 deforms in association with vibration input, the filling fluid flows between both the fluid chambers A, B via the fluid flow path 7, thereby attenuating the vibration.

In FIG. 1, rubber members such as the vibration damping rubber body 1 and the rubber membrane 3 correspond to the "chamber walls which deform in accordance with vibration input." Accordingly, in the present invention, it is necessary that the rubber members be made from the diene-based rubber.

Examples of the diene-base rubber include a natural rubber (NR), an isoprene rubber (IR), a butadiene rubber (BR), a styrene-butadiene rubber (SBR), an acrylonitrile-butadiene rubber (NBR), and an ethylene-propylene-diene-based rubber (EPDM). One kind of those rubbers is used alone, or two or more kinds thereof are used in combination. Of those, from the viewpoints of strength and low dynamic-to-static modulus ratio, a natural rubber is suitably used.

In addition, as materials for the rubber members such as the vibration damping rubber body 1, in addition to the diene-based rubber, there may be appropriately blended a reinforcing agent such as carbon black, a vulcanizing agent, a vulcanization accelerator, an antioxidant, a process oil, and the like as appropriate.

Examples of the vulcanizing agent include sulfur (such as powder sulfur, precipitated sulfur, and insoluble sulfur). One kind of those agents is used alone, or two or more kinds thereof are used in combination.

The blending amount of the vulcanizing agent falls within the range of preferably 0.3 to 7 parts by weight (hereinafter, abbreviated as "part(s)"), particularly preferably 1 to 5 parts with respect to 100 parts of the diene-based rubber. That is because of the following reasons. When the blending amount of the vulcanizing agent is excessively small, there is observed a tendency that a sufficiently cross-linked structure is not obtained and hence a dynamic-to-static modulus ratio and permanent set resistance are deteriorated. In contrast, when the blending amount of the vulcanizing agent is excessively large, there is observed a tendency that heat resistance is reduced.

Examples of the vulcanization accelerator include thiuram-, thiazole-, sulfenamide-, aldehyde ammonia-, aldehyde amine-, guanidine-, and thiourea-based vulcanization accelerators. One kind of those accelerators is used alone, or two or more kinds thereof are used in combination.

From the viewpoints of durability, heat resistance, and permanent set resistance, the blending amount of the vulcanization accelerator preferably falls within the range of 0.1 to 7 parts, particularly preferably 0.3 to 5 parts with respect to 100 parts of the diene-based rubber.

It should be noted that examples of the thiuram-based vulcanization accelerator include tetramethylthiuram disulfide (TMTD), tetraethylthiuram disulfide (TETD), tetrabutylthiuram disulfide (TBTD), tetrakis(2-ethylhexyl)thiuram disulfide (TOT), and tetrabenzylthiuram disulfide (TBzTD).

Further, examples of the thiazole-based vulcanization accelerator include dibenzothiazyl disulfide (MBTS), 2-mercaptobenzothiazole (MBT), sodium 2-mercaptobenzothiazole (NaMBT), and zinc 2-mercaptobenzothiazole (ZnMBT).

In addition, examples of the sulfenamide-based vulcanization accelerator include N-oxydiethylene-2-benzothiazolylsulfenamide (NOBS), N-cyclohexyl-2-benzothiazolylsulfenamide (CBS), N-t-butyl-2-benzothiazolesulfenamide (BBS), and N,N'-dicyclohexyl-2-benzothiazolesulfenamide.

Examples of the antioxidant include a carbamate-based antioxidant, a phenylenediamine-based antioxidant, a phenol-based antioxidant, a diphenylamine-based antioxidant, a quinoline-based antioxidant, an imidazole-based antioxidant, and waxes. One kind of those antioxidants is used alone, or two or more kinds thereof are used in combination.

In addition, the blending amount of the antioxidant falls within the range of preferably 1 to 10 parts, particularly preferably 2 to 5 parts with respect to 100 parts of the diene-based rubber.

Examples of the process oil include a naphthene-based oil, a paraffin-based oil, and an aromatic oil. One kind of those oils is used alone, or two or more kinds thereof are used in combination.

In addition, the blending amount of the process oil falls within the range of preferably 1 to 50 parts, particularly preferably 3 to 30 parts with respect to 100 parts of the diene-based rubber.

In addition, the rubber members such as the vibration damping rubber body 1 may each be produced by vulcanizing a rubber composition prepared by kneading the various materials as described above at high temperature (150 to 170° C.) for 5 to 30 minutes. The fluid-filled vibration damping rubber device as illustrated in FIG. 1 is produced by using the rubber members. In addition, it is necessary that the primary fluid chamber A and the auxiliary fluid chamber B in FIG. 1 be each filled with a filling fluid, and in the present invention, a glycol-based solution containing a benzotriazole-based compound having an amine group is used as the filling fluid.

Figure 2:
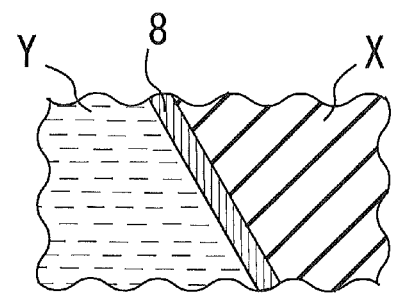
FIG. 2 is a cross-sectional view of an essential portion similar to FIG. 1 showing a forming state of a protective membrane at an interface.

A protective membrane 8 made of the benzotriazole-based compound and the diene-based rubber, which is not shown in FIG. 1, is naturally formed at an interface between the rubber body X for the fluid-filled vibration damping rubber device such as the vibration damping rubber body 1 in FIG. 1 and the filling fluid Y such as the filling fluid in the primary fluid chamber A in FIG. 1 as illustrated in FIG. 2 through the passing of time without involving a step of particular operation such as forming a protective membrane at the interface.

The benzotriazole-based compound having an amine group has preferably a weight-average molecular weight (Mw) of 300 or less, more preferably a weight-average molecular weight (Mw) in the range of 119 to 200. That is because, when the weight-average molecular weight of the benzotriazole-based compound falls within the range, the membrane made from the compound is denser, and hence there is provided an even better action and effect of suppressing the dissolution of components in the rubber body into the filling fluid.

It is preferred to use, as the benzotriazole-based compound having an amine group, a compound represented by the following general formula (1). That is because molecules of this compound densely assemble to provide a high effect of suppressing the dissolution of components in the rubber body into the filling fluid by virtue of the chemical structure shown below.

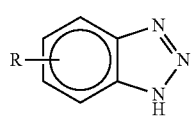

(1)

(In the formula (1), R represents any one of a hydrogen atom and an alkyl group having 1 to 4 carbon atoms.)

In addition, among compounds each represented by the general formula (1), 1H-benzotriazole, 4-methyl-1H-benzotriazole, and 5-methyl-1H-benzotriazole are more preferred because of being capable of forming a denser membrane, thereby providing an even better effect of suppressing the dissolution of components in the rubber body into the filling fluid.

A glycol-based solvent such as ethylene glycol or diethylene glycol is used as a solvent of the filling fluid, and water or the like is added thereto as appropriate.

Further, the added amount of the benzotriazole-based compound having an amine group with respect to the solvent is preferably set to 5 to 500 mmol/L, more preferably 10 to 100 mmol/L. That is because blending the benzotriazole-based compound having an amine group in an amount in the range can effectively suppress the dissolution of components in the rubber body into the filling fluid.

Meanwhile, for any other member except the rubber members and the filling fluid constituting the fluid-filled vibration damping mount illustrated in FIG. 1, typically, a member is used which is made of a metal such as iron, copper, aluminum, magnesium, lead, tin, or an alloy thereof, or stainless steel. It should be noted that an adhesive is used as appropriate to join any such metal member and the rubber members.

While the fluid-filled vibration damping mount illustrated in FIG. 1, which has been given as an example of the fluid-filled vibration damping rubber device, may be applied to an engine mount for an automobile and the like, the present invention may be applied to, for example, a suspension bushing, a body mount, a subframe mount, and a differential mount as well as the engine mount. In addition, the present invention may be applied to, for example, fluid-filled vibration damping rubber devices to be used for transport equipment such as industrial transport vehicles including an aircraft, a forklift, an excavator, and a crane, and railroad vehicles as well as those fluid-filled vibration damping rubber devices for automobiles.

EXAMPLES

Next, examples are described together with comparative examples. It should be noted that the present invention is not limited to these examples.

First, prior to the examples and the comparative examples, the following additives (i) to (ix) were prepared.

(Additive (i))
Benzotriazole-based compound having an amine group (1H-benzotriazole (SEETEC BT-R manufactured by SHIPRO KASEI KAISHA, LTD.))

(Additive (ii))
Benzotriazole-based compound having an amine group (mixture of 4-methyl-1H-benzotriazole and 5-methyl-1H-benzotriazole (SEETEC TT-R manufactured by SHIPRO KASEI KAISHA, LTD.))

(Additive (iii))
Benzotriazole-based compounds each free of any amine group (3-(2H-benzotriazol-2-yl)-5-(1,1-dimethylethyl)-4-hydroxybenze nepropanoic acid (C7-9) branched and linear alkyl esters (TINUVIN 384-2 manufactured by BASF))

(Additive (iv))
Benzotriazole-based compound free of any amine group (methyl 3-(3-(2H-benzotriazol-2-yl)-5-t-butyl-4-hydroxyphenyl)propiona to (TINUVIN 1130 manufactured by BASF)) (Additive (v))

Benzotriazole-based compound free of any amine group (octyl 3-[3-tert-butyl-4-hydroxy-5-(5-chloro-2H-benzotriazol-2-yl)phenyl]propionate (TINUVIN 109 manufactured by BASF))

(Additive (vi))
Amine-based compound (N-(1,3-dimethylbutyl)-N'-phenyl-p-phenylenediamine (OZONONE 6C manufactured by Seiko Chemical Co., Ltd.))

(Additive (vii))
Phenol-based compound (2,2'-methylenebis(4-methyl-6-tert-butylphenol) (NOCRAC NS-6 manufactured by OUCHI SHINKO CHEMICAL INDUSTRIAL CO., LTD.))

(Additive (viii))
Sulfur-based compound (2-mercaptobenzimidazole (NOCRAC MB manufactured by OUCHI SHINKO CHEMICAL INDUSTRIAL CO., LTD.))

(Additive (ix))
Sulfur-based compound (nickel dibutyldithiocarbamate (NOCRAC NBC manufactured by OUCHI SHINKO CHEMICAL INDUSTRIAL CO., LTD.))

Examples 1 and 2, and Comparative Examples 1 to 8

A fluid-filled vibration damping mount having the shape illustrated in FIG. 1 was produced. A vulcanized rubber molded body, corresponding to the vibration damping rubber body 1 illustrated in the figure, used in this case was one made of a rubber composition obtained by kneading 100 parts of a natural rubber (NR), 5 parts of zinc oxide, 1 part of stearic acid, 50 parts of FEF carbon, 20 parts of an naphthene oil, 1 part of an antioxidant, 2 parts of a vulcanization accelerator (N-cyclohexyl-2-benzothiazolesulfenamide), 1 part of a vulcanization accelerator (tetrathiuram disulfide), and 1 part of sulfur. In addition, the filling fluid used in this case was one obtained by mixing ethylene glycol and propylene glycol at a ratio of 7:3 (weight ratio) to prepare a solvent, and adding, to the solvent, any one of the additives (i) to (ix) at 50 mmol/L (Comparative Example 8 was free of any additive). It should be noted that Table 1 and Table 2 below show the kind of the additive added in the filling fluid, and the functional group and weight-average molecular weight (Mw) of the additive together.

Further, the fluid-filled vibration damping mounts of the examples and the comparative examples thus obtained were evaluated for their characteristics in accordance with the following criteria. Table 1 and Table 2 below show the results together.

(Fluid-Resistant Property)

The fluid-filled vibration damping mount was left to stand under a temperature condition of 80° C. for 240 hours, and then a JIS No. 7 dumbbell-shaped rubber test piece was cut out of the vibration damping rubber body of the fluid-filled vibration damping mount at the contact surface with the filling fluid. Then, the test piece after the temperature treatment was measured for its tensile strength at break (TS) and elongation at break (EB) in conformity with JIS K 6251. Likewise, a test piece was also cut out of the vibration damping rubber body of the vibration damping mount before being filled with the fluid, and was measured for its TS and EB (initial physical properties). From the results of those measurements, rates of change in TS and EB (%) ($\Delta$TS and $\Delta$EB) between before and after the temperature treatment were calculated.

As can be seen from the results of the tables, in the examples in which the specific additive was added in the filling fluid, $\Delta$TS and $\Delta$EB were small in the evaluation for fluid-resistant property as compared to Comparative Example 8, in which no additive was added. Therefore, satisfactory results are obtained for durability characteristics of the fluid-filled vibration damping mount in the examples. In addition, it is considered from the above-mentioned results that the extraction of a component from the vibration damping rubber body into the filling fluid is suppressed in the examples.

On the other hand, in Comparative Examples 1 to 7, an additive was added in the filling fluid as in the examples, but an effect as exhibited in the examples could not be provided. That is, in Comparative Examples 1 to 3, although a benzotriazole-based compound was added as in the examples, the compound had no group reactive with the natural rubber, resulting in large $\Delta$TS and $\Delta$EB in the evaluation for fluid-resistant property. Thus, the fluid-filled vibration damping mounts of Comparative Examples 1 to 3 did not provide satisfactory results for durability characteristics. In Comparative Example 4, a compound having an amine group was added as in the examples, but an effect as exhibited in the examples was not obtained, probably because of the influences of the molecular structure, molecular weight, poor solubility in the filling fluid, and the like of the compound. The additive used in Comparative Examples 5 to 7 had no group reactive with the natural rubber as in Comparative Examples 1 to 3, and probably because of this, an effect as exhibited in Examples was not provided.

It should be noted that a membranous substance was observed on the test piece (JIS No. 7 dumbbell) in the examples after the evaluation for fluid-resistant property at the contact surface with the filling fluid, while such a membrane was essentially not observed on the test piece of the comparative examples.

In addition, although the polymer of the vulcanized rubber molded body was a natural rubber in the examples, results similar to those of the examples were obtained also in the cases of other diene-based rubbers.

Although specific forms of embodiments of the instant invention have been described above and illustrated in the

TABLE 1

| | | Example 1 | Example 2 | Comparative Example 1 | Comparative Example 2 | Comparative Example 3 |
|---|---|---|---|---|---|---|
| Additive | Kind | (i) | (ii) | (iii) | (iv) | (v) |
| | Functional group | Amine group | Amine group | Phenol group | Phenol group | Phenol group |
| | Molecular weight (Mw) | 119 | 133 | 451 | 602 | 488 |
| Fluid-resistant property | $\Delta$TS (%) | −7 | −2 | −62 | −58 | −70 |
| | $\Delta$EB (%) | −10 | −6 | −45 | −48 | −58 |

TABLE 2

| | | Comparative Example 4 | Comparative Example 5 | Comparative Example 6 | Comparative Example 7 | Comparative Example 8 |
|---|---|---|---|---|---|---|
| Additive | Kind | (vi) | (vii) | (viii) | (ix) | — |
| | Functional group | Amine group | Phenol group | Thiol group | Thioxy group | — |
| | Molecular weight (Mw) | 268 | 369 | 488 | 467 | — |
| Fluid-resistant property | $\Delta$TS (%) | −62 | −62 | −31 | −68 | −59 |
| | $\Delta$EB (%) | −51 | −53 | −28 | −56 | −51 | accompanying drawings in order to be more clearly understood, the above description is made byway of example and not as a limitation to the scope of the instant invention. It is contemplated that various modifications apparent to one of ordinary skill in the art could be made without departing from the scope of the invention.

The fluid-filled vibration damping rubber device of the present invention, which is preferably used as an engine mount, suspension bushing, body mount, subframe mount, differential mount, or the like to be used for a vehicle such as an automobile, may be applied to the following applications as well as the foregoing: fluid-filled cylindrical vibration damping devices to be used for trains, motorcycles, and the like, vibration-proof dampers for hard discs of computers, vibration-proof dampers for general home electrical appliances such as washing machines, and quakeproof (vibration-proof) devices and seismic isolation devices such as architectural quakeproof walls and quakeproof (vibration-proof) dampers in the fields of architecture and housing.

What is claimed is:

1. A fluid-filled vibration damping rubber device, comprising an enclosed space formed by chamber walls which deform in accordance with vibration input, the enclosed space being filled with a fluid,
    wherein the chamber walls each comprise a diene-based rubber; and
    the fluid comprises a glycol-based solution containing a benzotriazole-based compound having an amine group,
    wherein the benzotriazole-based compound having an amine group comprises a compound represented by the following general formula (1):

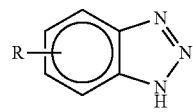

(1)

in the formula (1), R represents any one of a hydrogen atom and an alkyl group having 1 to 4 carbon atoms.

2. A fluid-filled vibration damping rubber device according to claim 1, wherein the benzotriazole-based compound having an amine group has a weight-average molecular weight (Mw) of 300 or less.

3. A fluid-filled vibration damping rubber device according to claim 1, wherein a content of the benzotriazole-based compound having an amine group with respect to a glycol-based solvent in the glycol-based solution falls within a range of 5 to 500 mmol/L.

4. A fluid-filled vibration damping rubber device according to claim 1, wherein the fluid-filled vibration damping rubber device comprises a vibration damping rubber device for an automobile, which is selected from the group consisting of an engine mount, a suspension bushing, a body mount, a subframe mount, and a differential mount.

5. A fluid-filled vibration damping rubber device according to claim 1, wherein the diene-based rubber comprises at least one selected from the group consisting of a natural rubber (NR), an isoprene rubber (IR), a butadiene rubber (BR), a styrene-butadiene rubber (SBR), an acrylonitrile-butadiene rubber (NBR), and an ethylene-propylene-diene-based rubber (EPDM).

6. A fluid-filled vibration damping rubber device according to claim 1, wherein a solvent of the glycol-based solution comprises at least one member selected from the group consisting of ethylene glycol, diethylene glycol, and a mixed liquid thereof with water.

7. A fluid-filled vibration damping rubber device according to claim 1, comprising a protective membrane made of the benzotriazole-based compound and the diene-based rubber formed at an interface between the chamber walls comprising the rubber body and the filling fluid.

8. A fluid-filled vibration damping rubber device, comprising an enclosed space formed by chamber walls which deform in accordance with vibration input, the enclosed space being filled with a fluid,
    wherein the chamber walls each comprise a diene-based rubber; and
    the fluid comprises a glycol-based solution containing a benzotriazole-based compound having an amine group,
    wherein the benzotriazole-based compound having an amine group comprises at least one member selected from the group consisting of 1H-benzotriazole, 4-methyl-1H-benzotriazole, and 5-methyl-1H-benzotriazole.

9. A fluid-filled vibration damping rubber device according to claim 8, wherein the benzotriazole-based compound having an amine group has a weight-average molecular weight (Mw) of 300 or less.

10. A fluid-filled vibration damping rubber device according to claim 8, wherein a content of the benzotriazole-based compound having an amine group with respect to a glycol-based solvent in the glycol-based solution falls within a range of 5 to 500 mmol/L.

11. A fluid-filled vibration damping rubber device according to claim 8, wherein the fluid-filled vibration damping rubber device comprises a vibration damping rubber device for an automobile, which is selected from the group consisting of an engine mount, a suspension bushing, a body mount, a subframe mount, and a differential mount.

12. A fluid-filled vibration damping rubber device according to claim 8, wherein the diene-based rubber comprises at least one selected from the group consisting of a natural rubber (NR), an isoprene rubber (IR), a butadiene rubber (BR), a styrene-butadiene rubber (SBR), an acrylonitrile-butadiene rubber (NBR), and an ethylene-propylene-diene-based rubber (EPDM).

13. A fluid-filled vibration damping rubber device according to claim 8, wherein a solvent of the glycol-based solution comprises at least one member selected from the group consisting of ethylene glycol, diethylene glycol, and a mixed liquid thereof with water.

14. A fluid-filled vibration damping rubber device according to claim 8, comprising a protective membrane made of the benzotriazole-based compound and the diene-based rubber formed at an interface between the chamber walls comprising the rubber body and the filling fluid.

15. A fluid-filled vibration damping rubber device, comprising an enclosed space formed by chamber walls which deform in accordance with vibration input, the enclosed space being filled with a fluid,
    wherein the chamber walls each comprise a diene-based rubber; and
    the fluid comprises a glycol-based solution containing a benzotriazole-based compound having an amine group,
    wherein the device comprises a protective membrane made of the benzotriazole-based compound and the diene-based rubber formed at an interface between the chamber walls comprising the rubber body and the filling fluid.

16. A fluid-filled vibration damping rubber device according to claim 15, wherein the benzotriazole-based compound having an amine group has a weight-average molecular weight (Mw) of 300 or less.

17. A fluid-filled vibration damping rubber device according to claim 15, wherein a content of the benzotriazole-based compound having an amine group with respect to a glycol-based solvent in the glycol-based solution falls within a range of 5 to 500 mmol/L.

18. A fluid-filled vibration damping rubber device according to claim 15, wherein the fluid-filled vibration damping rubber device comprises a vibration damping rubber device for an automobile, which is selected from the group consisting of an engine mount, a suspension bushing, a body mount, a subframe mount, and a differential mount.

19. A fluid-filled vibration damping rubber device according to claim 15, wherein the diene-based rubber comprises at least one selected from the group consisting of a natural rubber (NR), an isoprene rubber (IR), a butadiene rubber (BR), a styrene-butadiene rubber (SBR), an acrylonitrile-butadiene rubber (NBR), and an ethylene-propylene-diene-based rubber (EPDM).

20. A fluid-filled vibration damping rubber device according to claim 15, wherein a solvent of the glycol-based solution comprises at least one member selected from the group consisting of ethylene glycol, diethylene glycol, and a mixed liquid thereof with water.

* * * * *